3,516,610
WINDSCREEN WIPER AND WASHER MECHANISMS
Derek Norman Stevens, Dunstable, England, assignor to General Motors Corporation, Detroit, Mich., a corporation of Delaware
Filed Oct. 24, 1968, Ser. No. 770,319
Claims priority, application Great Britain, Oct. 26, 1967, 48,672/67
Int. Cl. B05b *1/10;* B05s *1/46*
U.S. Cl. 239—284          4 Claims

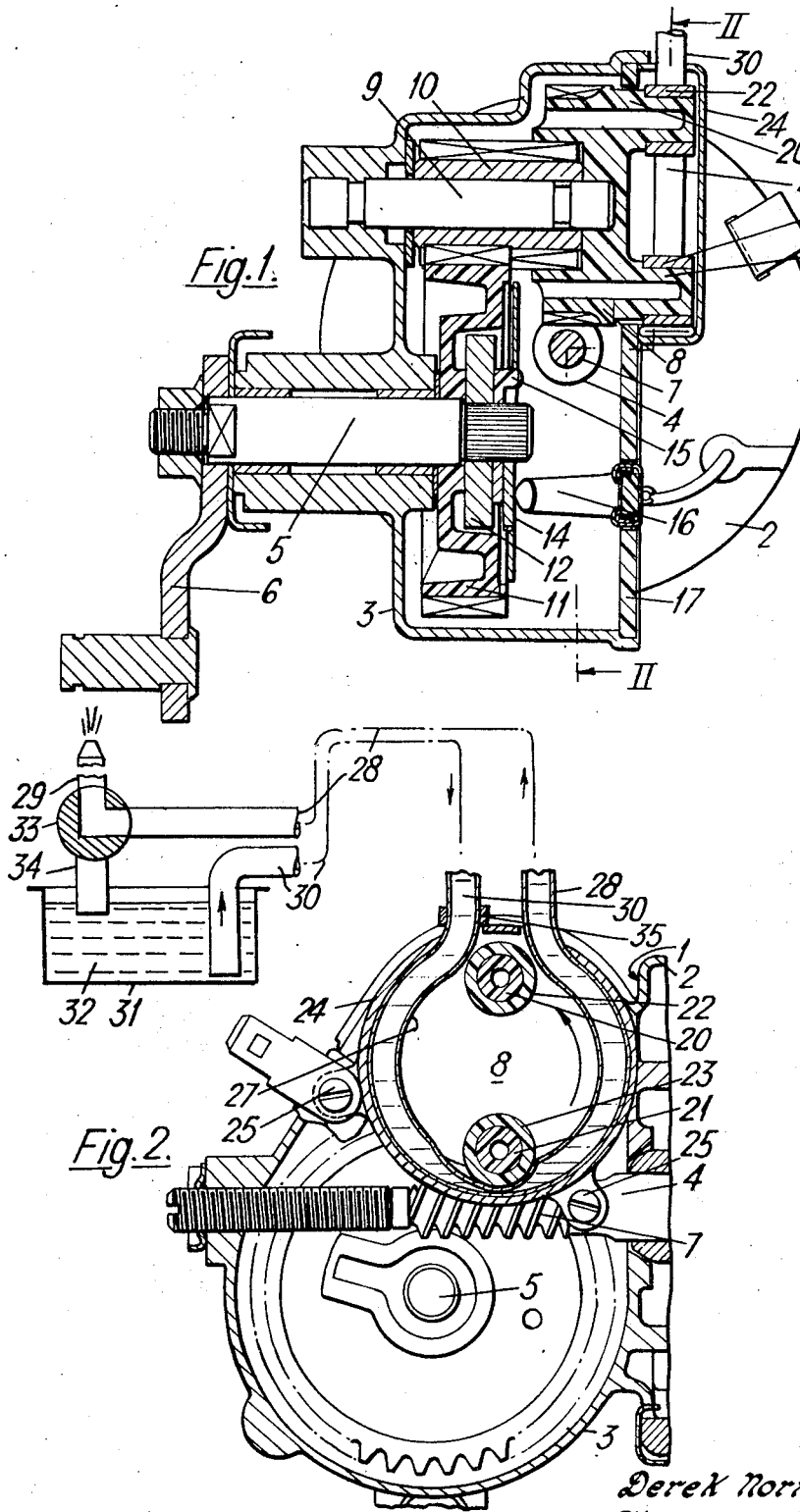

ABSTRACT OF THE DISCLOSURE

Rollers carried by one of the drive gears of a windscreen wiper motor progressively roll along and squeeze a portion of a flexible tube, the ends of which are connected to a wash liquid reservoir and a washer nozzle, so as to pump liquid from the reservoir and eject it from the nozzle.

---

This invention relates to windscreen wiper and washer mechanisms and in particular to a windscreen wiper and washer mechanism in which the wipers are driven by an electric motor.

In a windscreen wiper and washer mechanism according to the invention a rotary member of drive gearing between a windscreen wiper electric drive motor and a wiper drive crank has secured thereon a carrier member which carries at least one freely running roller, and a resiliently flexible tube, the opposite ends of which are adapted to be connected respectively to a wash liquid reservoir and windscreen washer nozzles, is arranged with an intermediate portion thereof extending in the path of movement of said roller, the relative positions of said carrier member and said intermediate tube portion being such that on rotation of the carrier member said roller rolls along and progressively flattens the tube portion from one end to the other thereof so as to pump liquid from the reservoir to the nozzle when the ends of the tube are connected thereto.

The carrier member may be formed as an eccentric around the periphery of which is a single roller; or a plurality of angularly spaced rollers may be spaced around a circular or other carrier member, so that the rollers successively engage the intermediate tube portion during each rotation of the carrier member.

The carrier member preferably forms part of an intermediate gear in the wiper drive mechanism, so that the liquid will be pumped at a rate which is sufficiently high to ensure a substantially continuous delivery of the wash liquid from the nozzles. Alternatively, the carrier member and roller may be mounted for rotation with the final drive gear so as to deliver intermittent squirts of the wash liquid. By appropriate angular adjustment of the carrier member relative to the final drive gear the squirts of wash liquid may be delivered when the wiper blades are in a predetermined position on the windscreen of the vehicle in which the mechanism is installed.

The intermediate portion of the tube and the carrier member and roller cooperate to form a peristaltic pump which will be in operation whenever the windscreen wiper motor is in operation: accordingly, a control device is incorporated in the flow line between the peristaltic pump and the nozzles so that when operation of the windscreen washer is not desired the wash liquid being pumped is returned to the wash liquid reservoir.

Such control device may be in the form of a two-way valve; or a bistable wall-attachment fluid amplifier may be used to divert the liquid being pumped into either of two passages one of which is in communication with the nozzle and the other of which is in communication with the wash liquid reservoir.

The pressure signal required to actuate the fluid amplifier may be obtained by opening or closing a passage in the amplifier to atmosphere or to a source of vacuum, which may conveniently be the induction manifold of the engine of the vehicle on which the windscreen wiper mechanism is installed.

The delivery of wash liquid by the pump can also be controlled by means of a closable vent in the suction side of the tube.

The scope of the invention is defined by the appended claims; and the invention and the method by which it is to be performed are hereinafter particularly described with reference to the accompanying drawings in which:

FIG. 1 is a vertical section through the drive gearing of a preferred embodiment of an electric windscreen wiper and washer mechanism according to the invention; and FIG. 2 is a section on the line 2—2 of FIG. 1.

The electric windscreen wiper and washer mechanism shown in the drawings includes an electric motor 1, an end frame 2 of which is formed integral with a housing 3 for drive gearing between the motor armature shaft 4 and a cross-shaft 5 on which is secured a rotary crank arm 6 to which the wiper arm actuator linkage is adapted to be connected.

The armature shaft 4 is formed with a worm 7 which meshes with the external teeth of a gear 8 which is rotatably mounted on one end of a shaft 9 the other end of which is fixed in the housing 3, the latter conveniently being formed as a casting in which the said other end of the shaft 9 is secured during the casting operation.

The gear 8 is also formed with internal teeth which mesh with the teeth of an intermediate gear 10 which is also in mesh with a gear 11 secured on the inner end of the cross-shaft 5.

The gears 8, 10 and 11 are conveniently made of a plastics material such as nylon.

The inner end of the cross-shaft 5 also carries an assembly of a pair of metal plates 12, 14 between which is secured a member 15 of plastics or other insulation material, a part of which extends through an aperture in the plate 14 and co-operates with a contact 16 mounted in a cover plate 17 of insulation material for the housing 3, to form in known manner a parking switch for the windscreen wiper mechanism.

The face of the gear 8 opposite that in engagement with the worm 7 and gear 10 has also formed integral therewith a pair of diametrically opposed cylindrical bosses 20, 21 on which carry a pair of freely rotatable rollers 22, 23, the bosses 20, 21 and the rollers 22, 23 extending into a chamber formed by a circular casing 24 which is secured by screws 25 to the housing 3. Alternatively, the rollers could be carried on bosses on a separate carrier member secured to the gear 8.

Lying against the inner periphery of the casing 24 is a tube 27 of resilient plastics or elastomeric material, one end portion 28 of which is adapted to be connected to a windscreen washer nozzle 29 and the other end portion 30 of which extends into a reservoir 31 for containing windscreen washer liquid 32.

A two-way valve 33 is connected to the windscreen washer nozzle 29, the end 28 of the tube 27, and to a further tube 34 which extends into the reservoir 31, the valve 33 being movable so as in one position to connect the end 28 of the tube 27 with the washer nozzle 29 and in the other position to connect the end 28 of the tube 27 with the tube 34 which leads into the reservoir 31.

The ends 28, 30 of the tube 27 extend through openings in the circular casing 24 and are spaced apart from each other so that, as shown in FIG. 2, in one position of rotation of the gear wheel 8 the roller 22 lies intermediate and out of contact with the two end portions 28, 30 of the tube 27 while the other roller 23 is in engagement with an intermediate portion of the tube 27 and flattens the tube by squeezing it between the surface of the roller and the inner wall of the casing 24.

The gear 8 is concentric with the wall of circular casing 24 so that during rotation of the gear 8 the rollers 22, 23 are each successively brought from a disengaged position between the two end portions 28, 30 of the tube 27 and into engagement with the arcuate portion of the tube 27 adjacent the wall of the casing 24, this portion of the tube then being progressively flattened from the end portion 30 to the other end portion 28 thereof during rotation of the gear 8. During such movement liquid in the tube is driven forward by the flattening of the tube at its point of contact with one or the other of the rollers and in this way wash liquid 32 is drawn into the end portion 30 of the tube and expelled through the end portion 28 of the tube. The expelled liquid, depending on the position of the valve 33, is then either projected from the washer nozzle 29 or, if operation of the washer on the windscreen is not desired, is returned to the reservoir 31 through the pipe 34.

It will be seen that with the construction described above the windscreen washer liquid is continually circulated through the tube 27 and can be delivered onto the windscreen as soon as the valve 33 is moved to the appropriate position.

Creepage of the tube around the periphery of the casing under the action of the rollers is conveniently prevented by means of a collar 35 secured around the end portion 30 of the tube 27 adjacent its point of entry into the casing 24.

I claim:

1. A windscreen wiper and washer mechanism comprising an electric windscreen wiper motor; a wiper drive crank adapted to be driven by said motor through the intermediary of drive gearing carried by said motor; a carrier member on a rotary member of said drive gearing; at least one freely running roller carried by said carrier member; and a resiliently flexible tube, the opposite ends of which are adapted to be connected respectively to a wash liquid reservoir and windscreen washer nozzles, an intermediate portion of said tube extending in the path of said roller and the relative positions of said carrier member and said intermediate tube portion being such that on rotation of the carrier member said roller rolls along and progressively flattens said intermediate tube portion from one end to the other thereof so as to pump liquid from the reservoir to the nozzle when said ends of the tube are connected thereto respectively.

2. A windscreen wiper and washer mechanism comprising an electric windscreen wiper motor; a wiper drive crank adapted to be driven by said motor through the intermediary of drive gearing carried by said motor, a carrier member formed by one face of a gear which forms part of said drive gearing; a pair of bosses projecting from said one face and located at diametrically opposed points on a circle concentric with the axis of said gear; a pair of rollers respectively freely rotatably mounted on said bosses; a casing which overlies said one face and has a circular wall concentric with said gear; and a resiliently flexible tube the opposite ends of which are adapted to be connected respectively to a wash liquid reservoir and windscreen washer nozzles and an intermediate portion of which lies adjacent said circular wall in the path of movement of said rollers, the relative positions of said rollers and said intermediate tube portion being such that on rotation of the carrier member said rollers successively roll along and progressively flatten the intermediate tube portion from one end thereof to the other so as to pump liquid from the reservoir to the nozzles when the ends of the tube are connected thereto.

3. A windscreen wiper and washer mechanism according to claim 2, including a control device interposed in the path for fluid flow through said tube and operable to return to the reservoir the liquid pumped to said nozzles upon rotation of said carrier member and rollers.

4. A windscreen wiper and washer mechanism according to claim 3, in which one end of said intermediate tube portion is secured to said casing to prevent creepage of said tube during rotation of said carrier and rollers.

References Cited

UNITED STATES PATENTS

| 2,835,916 | 5/1958 | Mitlog et al. | 15—250.04 |
| 3,084,370 | 4/1963 | Oishei et al. | 15—250.02 |
| 3,180,272 | 4/1965 | Broadfoot | 103—149 |

FOREIGN PATENTS

| 257,777 | 3/1965 | Australia. |

EVERETT W. KIRBY, Primary Examiner

U.S. Cl. X.R.

15—250.04